US008984516B2

(12) United States Patent
Gupta et al.

(10) Patent No.: US 8,984,516 B2
(45) Date of Patent: *Mar. 17, 2015

(54) SYSTEM AND METHOD FOR SHARED EXECUTION OF MIXED DATA FLOWS

(71) Applicant: International Business Machines Corporation, Armonk, NY (US)

(72) Inventors: Rajeev Gupta, Noida (IN); Padmashree Ravindra, Raleigh, NC (US); Prasan Roy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,331

(22) Filed: May 10, 2013

(65) Prior Publication Data

US 2013/0326534 A1  Dec. 5, 2013

Related U.S. Application Data

(63) Continuation of application No. 13/484,959, filed on May 31, 2012.

(51) Int. Cl.
*G06F 9/46* (2006.01)
*G06F 7/00* (2006.01)
*G06F 9/50* (2006.01)

(52) U.S. Cl.
CPC ............... *G06F 9/50* (2013.01); *G06F 9/5066* (2013.01)
USPC ............ 718/101; 718/102; 718/104; 707/720

(58) Field of Classification Search
None
See application file for complete search history.

(56) References Cited

U.S. PATENT DOCUMENTS

| | | | |
|---|---|---|---|
| 7,523,123 | B2 | 4/2009 | Yang et al. |
| 7,650,331 | B1 | 1/2010 | Dean et al. |
| 7,756,919 | B1 | 7/2010 | Dean et al. |
| 2010/0241646 | A1 | 9/2010 | Friedman et al. |
| 2011/0047172 | A1 | 2/2011 | Chen et al. |
| 2011/0066894 | A1 | 3/2011 | Berlyant et al. |
| 2011/0276962 | A1 | 11/2011 | Chambers et al. |

OTHER PUBLICATIONS

Ordonez Carlos, "Integrating K-Means Clustering with a Relational DBMS Using SQL," Feb. 2006, IEEE Transactions on Knowledge and Data Engineering, vol. 18 No. 2 pp. 188-201.*
Yang, et al., "Map-Reduce-Merge: Simplified Relational Data Processing on Large Clusters", SIGMOD (Jun. 12-14, 2007), pp. 1029-1040.

(Continued)

*Primary Examiner* — Abdullah Al Kawsar
*Assistant Examiner* — Bing Zhao
(74) *Attorney, Agent, or Firm* — Holland & Knight LLP; Brian J. Colandreo, Esq.; Jeffrey T. Placker, Esq.

(57) ABSTRACT

A method, computer program product, and computer system for shared execution of mixed data flows, performed by one or more computing devices, comprises identifying one or more resource sharing opportunities across a plurality of parallel tasks. The plurality of parallel tasks includes zero or more relational operations and at least one non-relational operation. The plurality of parallel tasks relative to the relational operations and the at least one non-relational operation are executed. In response to executing the plurality of parallel tasks, one or more resources of the identified resource sharing opportunities is shared across the relational operations and the at least one non-relational operation.

13 Claims, 10 Drawing Sheets

(56) References Cited

OTHER PUBLICATIONS

Alvaro, et al. "Multi-Query Optimization for Parallel Dataflow Systems", May 14, 2009, pp. 1-8.
Zhou et al., "Efficient Exploitation of Similar Subexpressions for Query Processing," SIGMOD '07, Jun. 12-14, 2007, pp. 533-544.
Nykiel et al., "MRShare: Sharing Across Multiple Queries in MapReduce," Preceedings of the VLDB Endowment, vol. 3, No. 1, pp. 494-505.
Lee et al., "YSmart: Yet Another SQL-to-MapReduce Translator," 2011, 31st International Conference on Distributed Computing systems, pp. 25-36.
Bu et al., "HaLoop: Efficient Iterative Data Processing on Large Clusters," Proceedings of the VLDB Endowment, vol. 3, No. 1, pp. 285-296.
Roy, "Multi-Query Optimization and Applications," Department of Computer Science and Engineering, Indian Institute of Technology—Bombay, 2000, pp. 1-147.

* cited by examiner

FIG. 10 ical workloads. For example, existing systems may translate/compile each data flow operation into one MapReduce job and/or a sequence of MapReduce jobs which may be executed independently by one or more processors across, e.g., a cluster of nodes.

SYSTEM AND METHOD FOR SHARED EXECUTION OF MIXED DATA FLOWS

RELATED APPLICATIONS

The subject application is a continuation application of U.S. patent application with Ser. No. 13/484,959, filed on May 31, 2012, the entire content of which is herein incorporated by reference.

TECHNICAL FIELD

This disclosure relates to parallel processing systems and methods.

BACKGROUND

Platforms, such as MapReduce based data flow platforms, may be used for processing, e.g., large scale ETL (Extract, Transform, Load) and analytical workloads. For example, existing systems may translate/compile each data flow operation into one MapReduce job and/or a sequence of MapReduce jobs which may be executed independently by one or more processors across, e.g., a cluster of nodes.

Data flows (which may include subflows) may also include, for example, relational operations and non-relational operations. Relational data flow operations executing on common input data may contain flow or subflow operations that may share computations that may be easily reused. Due to the relative simplicity of these operations, there exists simple sharing opportunities for intra-query as well as inter-query optimization across such flow or subflow operations to eliminate the redundant scans and computations.

SUMMARY OF DISCLOSURE

In one implementation, a method for shared execution of mixed data flows, performed by one or more computing devices, comprises identifying one or more resource sharing opportunities across a plurality of parallel tasks. The plurality of parallel tasks includes zero or more relational operations and at least one non-relational operation. The plurality of parallel tasks involving zero or more relational operations and at least one non-relational operation are executed. In response to executing the plurality of parallel tasks, one or more resources of the identified resource sharing opportunities is shared across tasks involving zero or more relational operations and at least one non-relational operation.

One or more of the following features may be included. Sharing one or more resources may include sharing common data input. The plurality of parallel tasks may include multiple clustering tasks or a clustering task and multiple grouping tasks, using one or more common data inputs in the plurality of parallel tasks. In case of multiple clustering tasks, a task of the plurality of parallel tasks may be designated as a primary task, wherein the key of the map phase may be the cluster-id of the primary task. The primary task selection criteria may include selection of a task that requires computation of highest number of clusters, a task that requires maximum number of iterations to converge, a task with fewest or containing maximum shared clustering attributes across the tasks, or a combination thereof. Sharing one or more resources may include at least one of sharing data reads, sharing computations, sharing intermediate results, sharing at least one of map and reduce computations, sharing data processing resources, sharing storage resources, sharing communication resources, sharing map output key-value pairs, and extending map output values. A map output of the merged task may include a combination of the cluster-id and a job-id as map-key, and a data value as the map-value may enable, at least in part, sharing of the map-output for multiple tasks. Separate reduce functions for different tasks may be used to calculate one or more cluster centers for each clustering task. In the merged task, the cluster-id of the primary task may be used as a key, and wherein cluster-ids of other tasks may be part of map output values. In reduce functions of the merged task, cluster centers may be calculated for the primary task, and wherein, for other tasks, post processing may occur after a reduce output to calculate cluster centers for the other tasks. A series of map and reduce functions may be called until a cluster termination condition for various tasks are obtained. In the merged task, the cluster-id of the primary task may be used as the map output key, and wherein a data value may be used as map output values. In a second reduce function, a new cluster center may be calculated, and wherein values may be grouped and aggregated for at least one grouping task. In multiple map-reduce calls of the clustering tasks, one or more grouping operations may be performed.

In another implementation, a computer program product resides on a computer readable medium that has a plurality of instructions stored on it. When executed by a processor, the instructions cause the processor to perform operations comprising identifying one or more resource sharing opportunities across a plurality of parallel tasks. The plurality of parallel tasks includes zero or more relational operations and at least one non-relational operation. The plurality of parallel tasks involving zero or more relational operations and at least one non-relational operation are executed. In response to executing the plurality of parallel tasks, one or more resources of the identified resource sharing opportunities are shared across tasks involving zero or more relational operations and at least one non-relational operation.

One or more of the following features may be included. One or more of the following features may be included. Sharing one or more resources may include sharing a common data input. The plurality of parallel tasks may include multiple clustering tasks. The multiple clustering tasks may include using a cluster-id with or without a job-id as a map-key. In case of multiple clustering tasks, a task of the plurality of parallel tasks may be designated as a primary task, wherein the cluster-id of the primary task may be the map key. The primary task selection criteria may include selection of a task that requires computation of highest number of clusters, a task that requires maximum number of iterations to converge, a task with fewest or containing maximum shared clustering attributes across the tasks, or a combination thereof. The plurality of parallel tasks may also include a clustering task and multiple grouping tasks using one or more common data inputs in a single task of the plurality of parallel tasks. Sharing one or more resources may include at least one of sharing data reads, sharing computations, sharing intermediate results, sharing at least one of map and reduce computations, sharing data processing resources, sharing storage resources, sharing communication resources, sharing map output key-value pairs, and extending map output values. A map output of the merged task may include a combination of the cluster-id and a job-id as map-key, and a data value as the map-value may enable, at least in part, sharing of the map-output for multiple tasks. Separate reduce functions for different tasks may be used to calculate one or more cluster centers for each clustering task. In the merged task, the cluster-id of the primary task may be used as a key, and wherein cluster-ids of other tasks may be part of map output values. In reduce functions of the merged task, cluster centers may be calculated for the primary task, and wherein, for other tasks, post processing may occur after a reduce output to calculate cluster centers for the other tasks. A series of map and reduce functions may be called until a cluster termination condition for various tasks are obtained. In the merged task, the cluster-id of the primary task may be used as the map output key, and wherein a data value may be used as map output values. In a second reduce function, a new cluster center may be calculated, and wherein values may be grouped and aggregated for at least one grouping task. In multiple map-reduce calls of the clustering tasks, one or more grouping operations may be performed.

In another implementation, a computing system includes a processor and memory configured to perform operations comprising identifying one or more resource sharing opportunities across a plurality of parallel tasks. The plurality of parallel tasks includes zero or more relational operations and at least one non-relational operation. The plurality of parallel tasks involving zero or more relational operations and at least one non-relational operation are executed. In response to executing the plurality of parallel tasks, one or more resources of the identified resource sharing opportunities is shared across tasks involving zero or more relational operations and at least one non-relational operation.

One or more of the following features may be included. Sharing one or more resources may include sharing a common data input. The plurality of parallel tasks may include multiple clustering tasks. The multiple clustering tasks may include using a cluster-id with or without a job-id as a map-key. In case of multiple clustering tasks, a task of the plurality of parallel tasks may be designated as a primary task, wherein the cluster-id of the primary task may be a map key. The primary task selection criteria may include selection of a task that requires computation of highest number of clusters, a task that requires maximum number of iterations to converge, a task with fewest or containing maximum shared clustering attributes across the tasks, or a combination thereof. The plurality of parallel tasks may also include a clustering task and multiple grouping tasks using one or more common data inputs in a single task of the plurality of parallel tasks. Sharing one or more resources may include at least one of sharing data reads, sharing computations, sharing intermediate results, sharing at least one of map and reduce computations, sharing data processing resources, sharing storage resources, sharing communication resources, sharing map output key-value pairs, and extending map output values. A map output of the merged task may include a combination of the cluster-id and a job-id as map-key, and a data value as the map-value may enable, at least in part, sharing of the map-output for multiple tasks. Separate reduce functions for different tasks may be used to calculate one or more cluster centers for each clustering task. In the merged task, the cluster-id of the primary task may be used as a key, and wherein cluster-ids of other tasks may be part of map output values. In reduce functions of the merged task, cluster centers may be calculated for the primary task, and wherein, for other tasks, post processing may occur after a reduce output to calculate cluster centers for the other tasks. A series of map and reduce functions may be called until a cluster termination condition for various tasks are obtained. In the merged task, the cluster-id of the primary task may be used as the map output key, and wherein a data value may be used as map output values. In a second reduce function, a new cluster center may be calculated, and wherein values may be grouped and aggregated for at least one grouping task. In multiple map-reduce calls of the clustering tasks, one or more grouping operations may be performed.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

System Overview

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list)

of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or combinations thereof. Additionally/alternatively, platforms, such as MapReduce based data flow platforms, may be used for processing, e.g., large scale ETL (Extract, Transform, Load), analytical workloads, etc.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
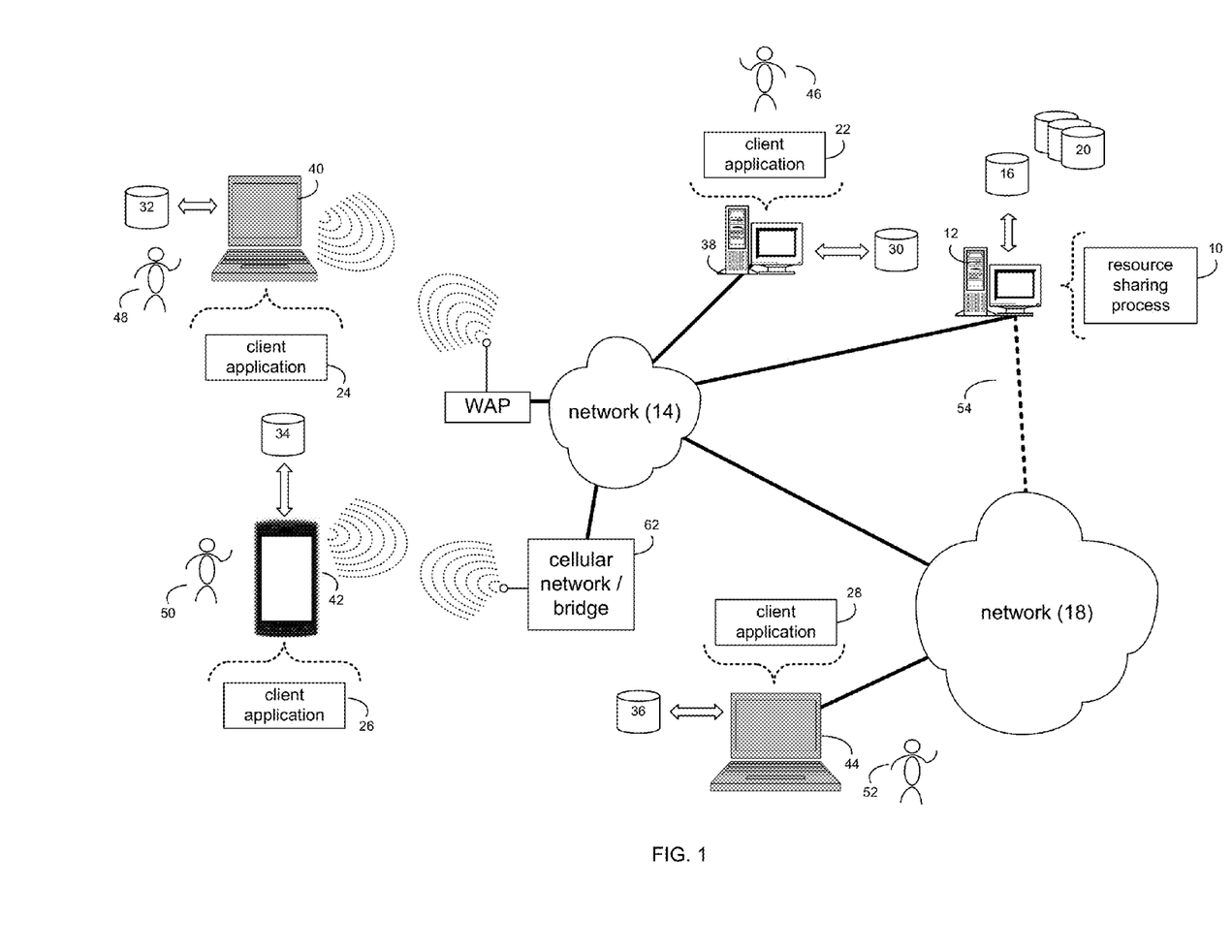
FIG. 1 is an illustrative diagrammatic view of a resource sharing process coupled to a distributed computing network.
Figure 2:
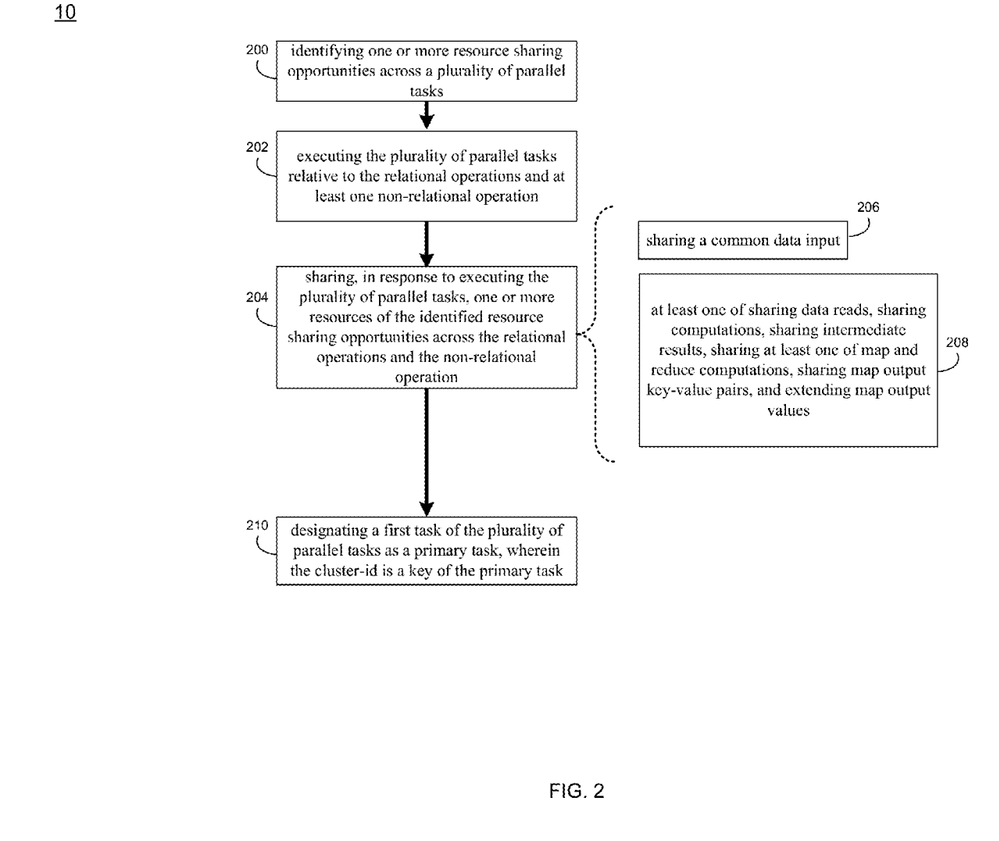
FIG. 2 is an illustrative flowchart of the resource sharing process of FIG. 1.

Referring to FIG. 1, there is shown resource sharing process 10 that may reside on and may be executed by computer 12, which may be connected to network 14 (e.g., the internet or a local area network). Examples of computer 12 may include but are not limited to a single server computer, a series of server computers, a single personal computer, a series of personal computers, a mini computer, a tablet computer, a mainframe computer, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, resource sharing process 10 may identify one or more resource sharing opportunities across a plurality of parallel tasks. The plurality of parallel tasks may include zero or more relational operations and at least one non-relational operation. The plurality of parallel tasks relative to zero or more relational operations and at least one non-relational operation may be executed. In response to executing the plurality of parallel tasks, one or more resources of the identified resource sharing opportunities may be shared across zero or more relational operations and at least one non-relational operation.

The instruction sets and subroutines of resource sharing process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database 20 (e.g., relational database) (not shown) and may be located within any suitable memory location, such as storage device 16 coupled to computer 12. In some embodiments, computer 12 may, with database 20, utilize a database management system such as, but not limited to, "My Structured Query Language" (MySQL) in order to provide multi-user access to one or more databases, such as the above noted relational database. The data store may also be a custom database, such as, for example, a flat file database or an XML database. Any other form(s) of a data storage structure may also be used. The above noted data store may be, in whole or in part, distributed in a cloud computing topology. In this way, computer 12 and storage device 16 may refer to multiple devices, which may also be distributed throughout the network.

Resource sharing process 10 may be accessed via client applications 22, 24, 26, 28. Examples of client applications 22, 24, 26, 28 may include but are not limited to one or more platforms, such as MapReduce based data flow platforms, which may be used for processing, e.g., large scale ETL (Extract, Transform, Load) and analytical workloads, Hadoop, standard and/or mobile web browser, email client application, textual and/or graphical user interface, a customized web browser, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), a television (not shown) with one or more processors embedded therein or coupled thereto, and a dedicated network device (not shown).

One or more of client applications 22, 24, 26, 28 may be configured to effectuate some or all of the functionality of resource sharing process 10 (and vice versa) and/or may include at least some of resource sharing process 10 (and vice versa). Accordingly, resource sharing process 10 may be a purely server-side application, a purely client-side application, or a hybrid server-side/client-side application that is cooperatively executed by one or more of client applications 22, 24, 26, 28 and resource sharing process 10.

Users 46, 48, 50, 52 may access computer 12 and resource sharing process 10 directly through network 14 or through secondary network 18. Further, computer 12 may be connected to network 14 through secondary network 18, as illustrated with phantom link line 54. Resource sharing process 10 may include one or more user interfaces, such as browsers and textual or graphical user interfaces, through which users 46, 48, 50, 52 may access resource sharing process 10.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, smart phones, and other electronic devices to be interconnected using a short-range wireless connection.

Client electronic devices 38, 40, 42, 44 may each execute an operating system, examples of which may include but are not limited to Android™, Apple iOS™, Microsoft Windows™, Redhat Linux™, or a custom operating system.

Figure 3:
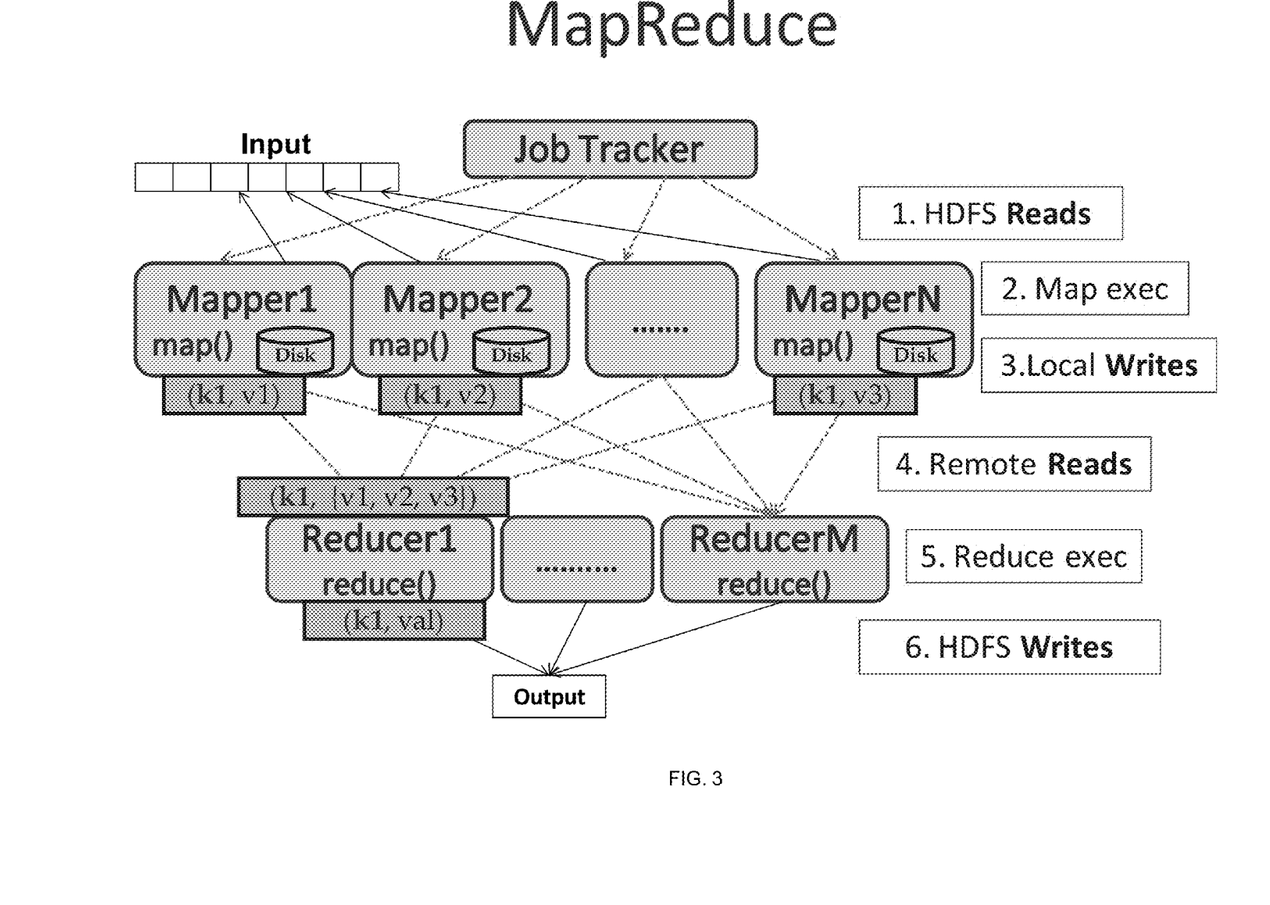
FIG. 3 is an illustrative MapReduce framework for parallel processing that may be associated with the resource sharing process of FIG. 1.

FIG. 3 is an illustrative MapReduce framework for parallel processing that may be associated with resource sharing process 10. Each MapReduce cycle (e.g., HDFS Reads, Map exec, Local Writes, Remote Reads, Reduce exec, HDFS Writes) may require I/O and/or communication overhead. The MapReduce framework may be identified as a fit platform for data analysis at, e.g., the Petabyte scale. The MapReduce framework may provide a simple model to write, e.g., distributed programs to be run over a large number of machines, e.g., cheap machines. Generally, MapReduce is a dataflow programming model that may pass data items through, e.g., user-written code fragments. For example, MapReduce may start with a large data file that may be broken down into contiguous pieces called a split. Each split may be converted via user-defined parsing code into, e.g., (key, value) pairs, that may be sent to a Map module, which may invoke a user supplied Map function on each pair, producing a list of output key-value pairs. Some or all output values belonging to the same key value may be aggregated by a Reduce module (e.g., which may include and/or be executed by another machine).

Hadoop, for example, is an open source implementation of the MapReduce framework. It may be used, for instance, for writing applications which may process vast amount of data in parallel on large clusters of hardware in a fault-tolerant manner. In Hadoop, data is usually stored on Hadoop Distributed File System (HDFS) which is a massively distributed file system designed generally to run on, e.g., cheap commodity hardware. In HDFS, each file may be segmented into a number of blocks with each block, typically, having a size of, e.g., 64 MB. Other sizes may also be used. Fault tolerance may be achieved by replicating these data blocks over a number of nodes. HDFS, generally, has a master-slave architecture. An HDFS cluster, typically, has a single master, called, "name node" and a number of slave nodes. The name node may manage the file system name space, e.g., dividing the file into blocks and replicating them to suitable machines. Slaves, also called data nodes, may manage the storage corresponding to that node. In Hadoop, applications may be written as a series of MapReduce tasks.

Figure 4:
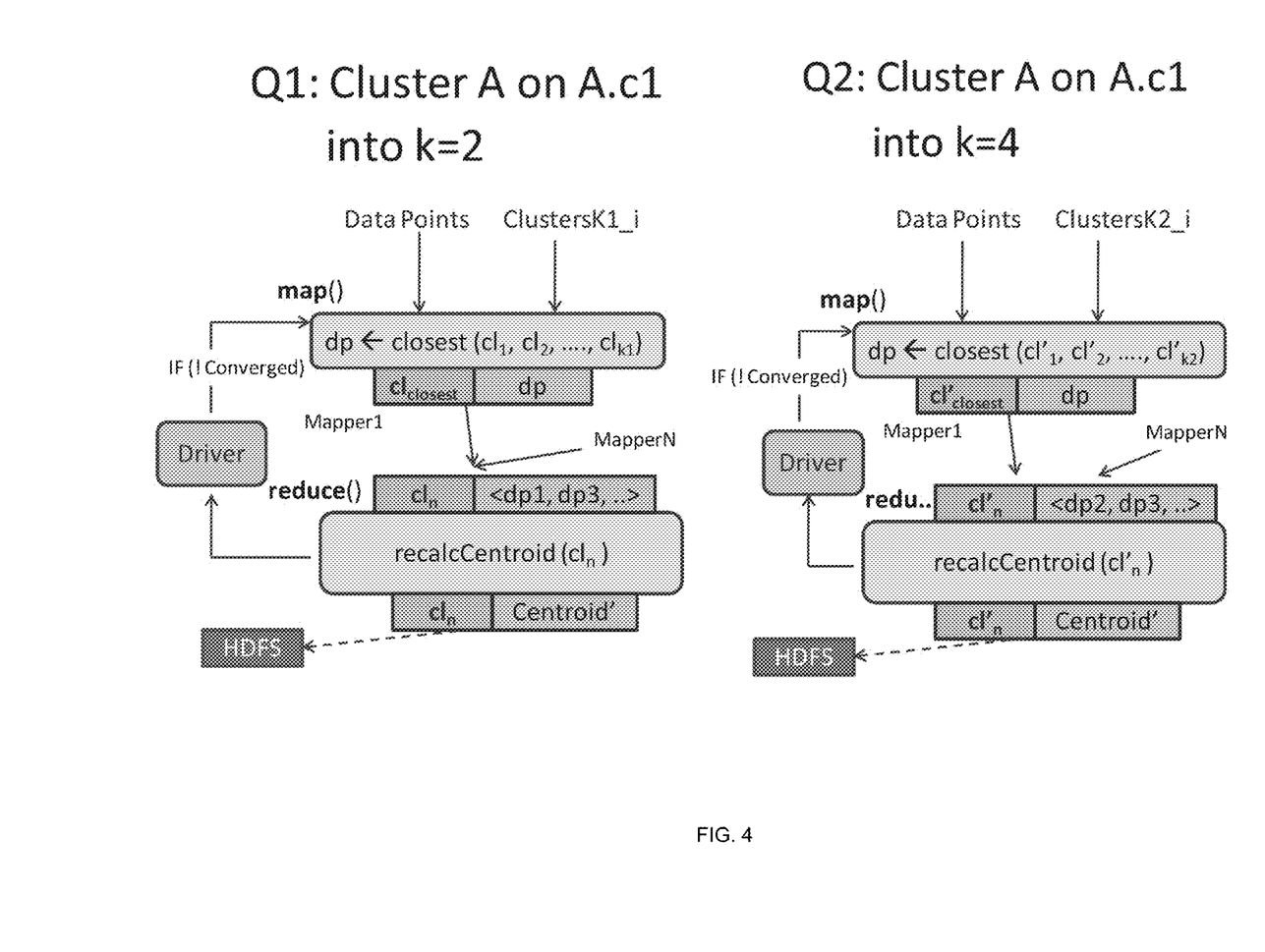
FIG. 4 is an illustrative k-means clustering example using MapReduce that may be associated with the resource sharing process of FIG. 1.

FIG. 4 is an illustrative k-means clustering example using MapReduce without the resource sharing. Illustratively, in a map phase, each data point may be assigned to its closest cluster center (or cluster-id). The chosen cluster-id may be used as the map output key, whereas the data point may be passed as a value to the reducer. In the reducer, for example, all data points that may belong to the same cluster-id may be used to recalculate the new cluster center. These cluster centers may be used in the next iteration of map, e.g., to assign data points to their closest cluster center. If there are multiple jobs performing k-means clustering on same data (possibly with different values of k), then, in known systems, they are executed independently.

The Resource Sharing Process:

As discussed above and referring also to FIGS. 5-10, resource sharing process 10 may provide data flow aware optimizations to reduce processing, IO and/or communication overhead (e.g., in a parallel processing environment). To help reduce processing, I/O and/or communication overhead, sharing process 10 may identify 200 one or more resource sharing opportunities across a plurality of parallel tasks. As noted below, the plurality of parallel tasks may include relational operations (e.g., join, union, grouping, difference, intersection, Cartesian product, division, etc.), and at least one non-relational operation (e.g., merge, clustering, classification, etc.), or a combination thereof. The identified 200 resource sharing opportunities may include, for example, sharing 208 input scans (e.g., [Q1]; A.c1 JOIN B.c4; [Q2]; GROUP on A.c2). Sharing scans may avoid, e.g., redundant HDFS reads. Resource sharing opportunities may also include, for example, sharing map( )/reduce( )(e.g., [Q3]; GROUP on A.c1 MAX(A.c3); [Q4]; GROUP on A.c1 CNT (A.c3), MAX(A.c3)). This may be useful, for example, when there may be operations with common computations. Resource sharing opportunities may also include, for example, sharing 208 map output (e.g., [Q5]; A.c1 JOIN B.c4; [Q6]; GROUP on A.c1). This may be useful, for example, when there may be operations with the same partition key. Additionally/alternatively, the use of a MapReduce sort phase (e.g., pushing computations, such as aggregations, into MapReduce sort phase) may use a secondary sort.

Resource sharing process 10 sharing 204 the one or more resources may include but is not limited to resource sharing process 10 sharing 206 a common data input (e.g., data partitioned for one task may be used for another task, where partitions for one tasks may subsume partitions for one or more other tasks), resource sharing process 10 sharing 208 data reads, computations (e.g., at least one of map and reduce computation), intermediate results, data processing resources, storage resources, communication resources, map output key-value pairs, and extending map output values.

The identified 200 resource sharing opportunities may be stored on the above described database and/or on any other storage device (e.g., 30, 32, 34, 36). Additionally/alternatively, the identified 200 resource sharing opportunities may be stored in memory on any of the above described client electronic devices (e.g., 38, 40, 42, 44). Additionally/alternatively, the identified 200 resource sharing opportunities may be generated during execution by resource sharing process 10 and may be subsequently stored.

As will be seen from at least some of the examples throughout, the plurality of parallel tasks executed 202 by resource sharing process 10 may include a clustering task and multiple grouping tasks sharing 206 one or more common data inputs in a single task of the plurality of parallel tasks. The plurality of parallel tasks executed 202 by resource sharing process 10 may include multiple clustering tasks. Clustering may be performed by resource sharing process 10 using a set of attributes where one or more clustering attributes are common across tasks.

Figure 5:
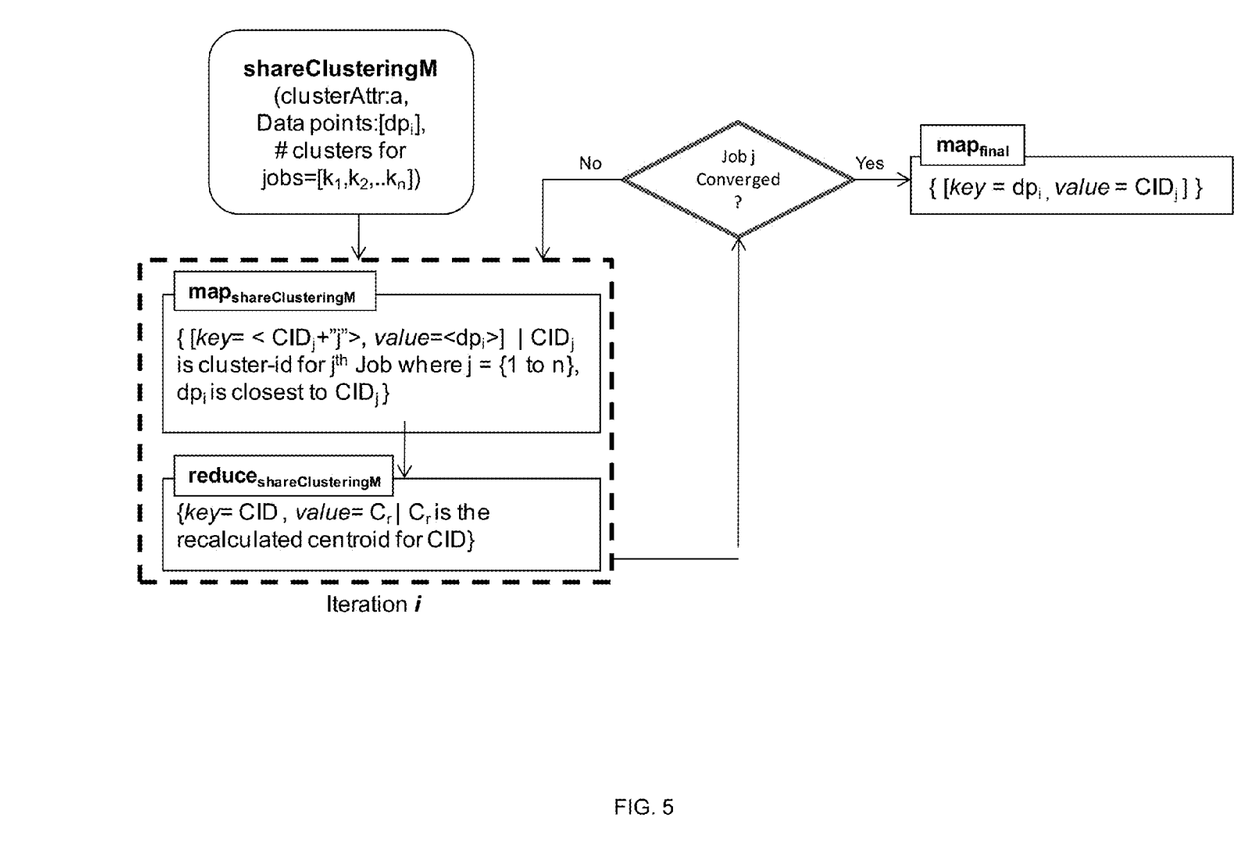
FIG. 5 is an illustrative MapReduce example flowchart for merging of multiple k-means clustering jobs as a single job, using algorithm shareClusteringM that may be associated with the resource sharing process of FIG. 1.

As noted above, the plurality of parallel tasks executed 202 by resource sharing process 10 may include zero or more relational operations and at least one non-relational operation, or a combination thereof. Examples of sharing across tasks may be additionally illustrated by FIGS. 5-8. For instance, FIG. 5 illustrates an example flowchart for merging of multiple k-means clustering jobs as a single job using shareClusteringM algorithm. In the merged job, different map outputs may be emitted for each of the different jobs. For example, for each data point and job combination, the map function $map_{shareClusteringM}$ may output a combination of job-id and cluster-id as map output key and data point used as value. There may be different reduce function invocations for different jobs. In each reduce function represented as $reduce_{shareClusteringM}$, all the data points belonging to the same job-id and cluster-id combination are used to calculate the modified cluster centers. These cluster centers may be used in the next iteration of map phase to assign data points to their closest cluster center. This process may be continued until the appropriate clusters are found.

As can be seen in the example(s), input scans and map functions may be shared 204 by resource sharing process 10. As can also be seen in the example(s), multiple clustering jobs may be executed concurrently in a single MapReduce cycle. There may be n redundant copies of data point $dp_i$ in the map output corresponding to the n clustering tasks.

Figure 6:
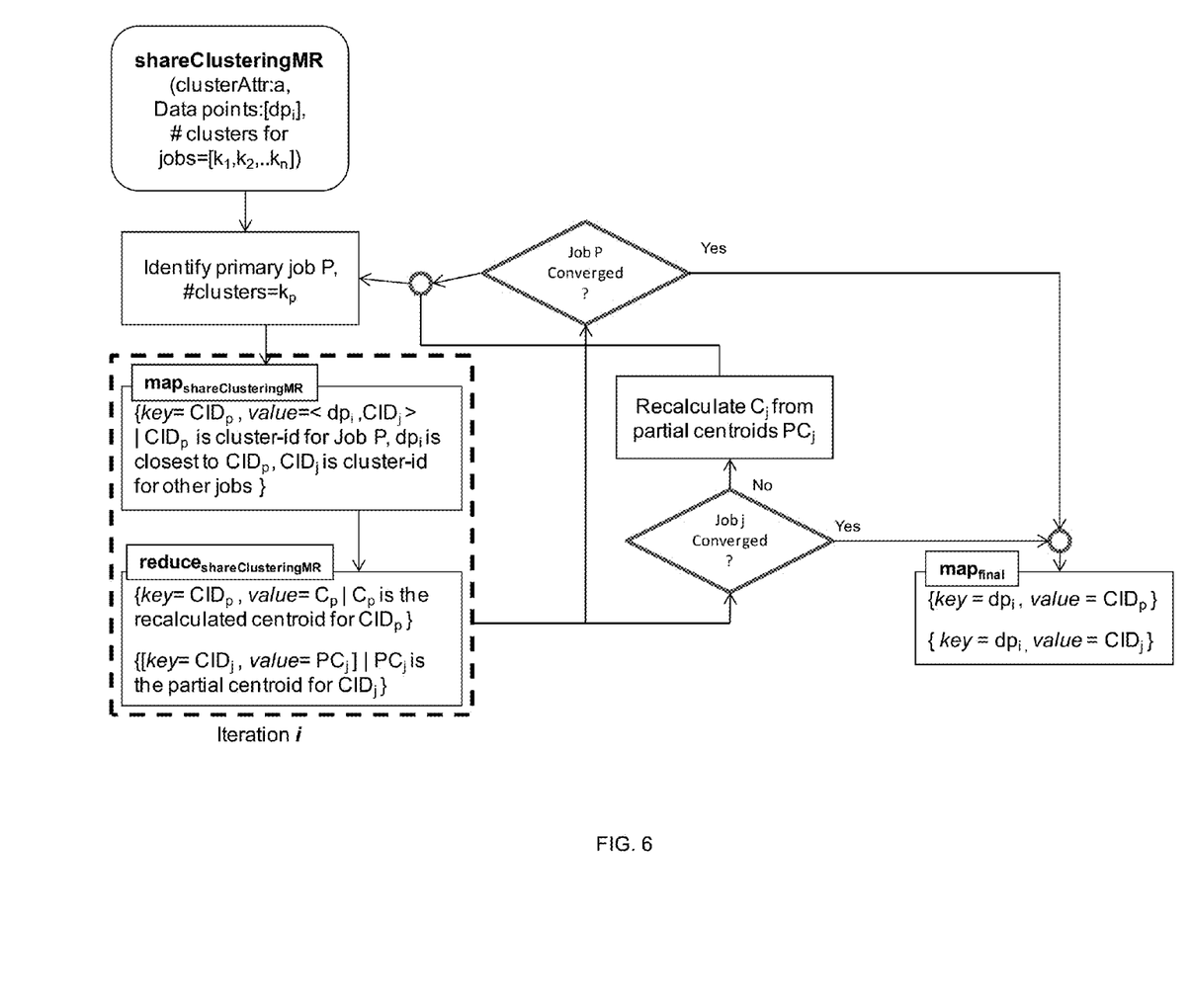
FIG. 6 is an illustrative MapReduce example flowchart for merging of multiple k-means clustering jobs as a single job using algorithm shareClusteringMR that may be associated with the resource sharing process of FIG. 1.

Another example of resource sharing process 10 sharing 204 across tasks is illustrated by FIG. 6. FIG. 6 illustrates an example flowchart for an algorithm (e.g., named shareClusteringMR) for merging multiple clustering jobs (or tasks). In this example algorithm, a primary job (job P with number of clusters kp) may be designated 210 and all other jobs may be considered secondary jobs. In the map phase, the map function $map_{shareClusteringMR}$ assigns each data point, which may need to be clustered, to the closest cluster center for each of the clustering jobs. A Cluster-id corresponding to the primary job ($CID_p$) may be emitted as map-key, whereas cluster-ids for secondary jobs ($CID_j$) and the data point may form part of the (merged) map value. In each of the reduce function ($reduce_{shareClusteringMR}$), new cluster centers ($C_p$) of primary jobs may be calculated, whereas for secondary jobs, partially aggregated information ($PC_j$) may be calculated. Partially aggregated information from all the reduce function may be kept in a distributed cache using which cluster centers for secondary jobs may be calculated. These modified cluster centers may be used in the next map phase to assign data points to cluster centers. This process may be continued until the appropriate clusters are found. According to at least one embodiment, the primary job may include a clustering job that requires computing the highest number of clusters, requires maximum number of iterations to converge, has a high number of common clustering attributes across jobs, or a combination thereof.

Figure 7:
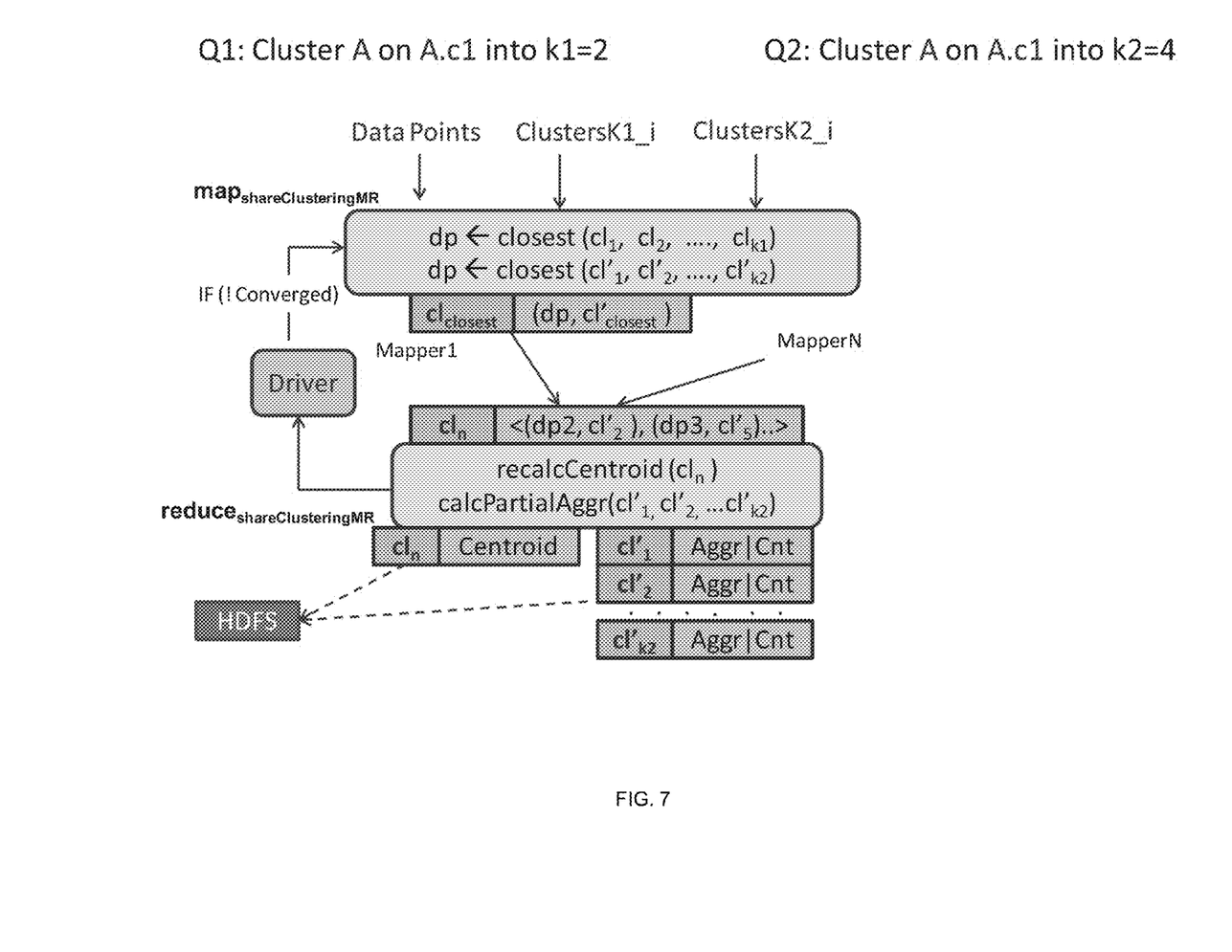
FIG. 7 illustrates the shareClusteringMR algorithm shown by FIG. 6 that may be associated with the resource sharing process of FIG. 1.
Figure 8:
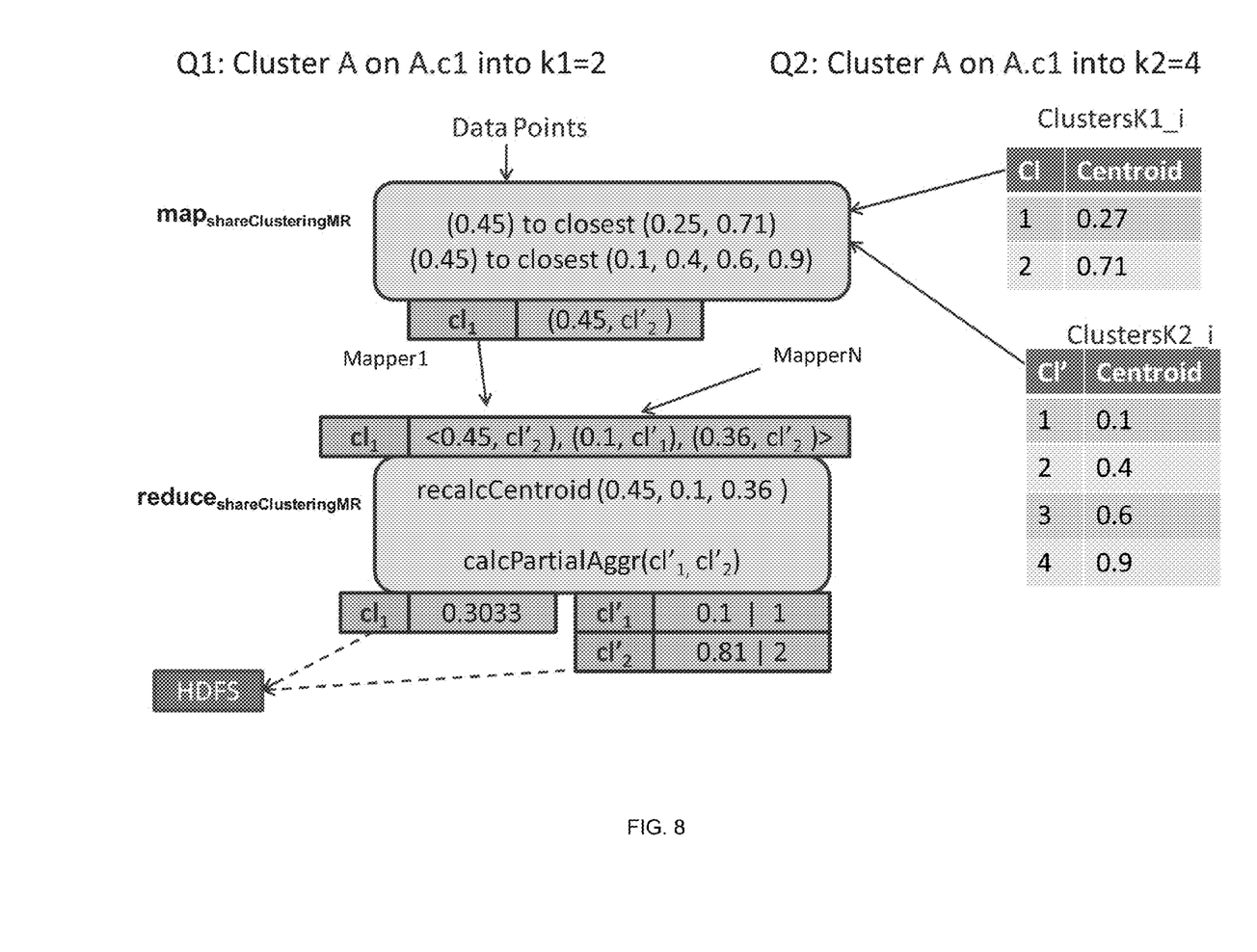
FIG. 8 illustrates an algorithm shown by FIG. 6 that may be associated with the resource sharing process of FIG. 1 where two jobs with k1=2 and k2=4 are merged.

FIG. 7 illustrates the shareClusteringMR algorithm shown by FIG. 6. As can be seen from FIG. 7, redundant scans of input data may be avoided, map outputs may be shared, and map function may be easily merged. FIG. 8 illustrates the example shareClusteringMR algorithm shown by FIG. 6 where two jobs with k1=2 and k2=4 are merged. As can be appreciated by those skilled in the art, k1=2 and k2=4 are examples only.

One task of the plurality of parallel jobs or tasks may be designated 210 by resource sharing process 10 as a primary task P, wherein the cluster-id of the primary task ($CID_p$) may be a map output key of the merged job/task (e.g., in the merge map function $Map_{shareClusteringMR}$, such that the cluster-id of the primary job is used as the key whereas cluster-ids of other jobs may be part of the map output values). According to at least one embodiment, the primary job may include a clustering job that requires computing the highest number of clusters, requires maximum number of iterations to converge, has a high number of common clustering attributes across jobs, or a combination thereof. With a reduce function of the merged task, cluster centers may be calculated for the primary task, whereas, for other tasks, post processing may be required after the reduce output to obtain the cluster centers. A series of map and reduce functions may be called until the cluster termination condition(s) for various tasks are obtained.

In the above example(s), the map output "value" of the merged map function $\text{map}_{shareClusteringMR}$ may carry information about the secondary clustering jobs ClustersK2 (e.g., map output value can be extended using a customized writable "value" object). The reduce function $\text{reduce}_{shareClusteringMR}$ partially aggregates the information about ClustersK2 and multiple files corresponding to each of the clustering jobs may be output, e.g., via resource sharing process 10 (MultipleOutputs API available to support multiple output from map/reduce functions). There may be a need for resource sharing process 10 to calculate the cluster centers for the secondary clustering jobs ClustersK2 from the partially aggregated information output by the reduce tasks. However, this may be done, e.g., by resource sharing process 10, at the configure method of the map function of the subsequent MapReduce cycle.

The illustrated and described plurality of parallel tasks may be executed 202 by resource sharing process 10 relative to zero or more relational operations and at least one non-relational operation. As can be seen from the above example(s), in response to executing 202 the plurality of parallel tasks, one or more resources of the identified 200 resource sharing opportunities may be shared 204 by resource sharing process 10 across jobs or tasks having at least one non-relational operation, shared 204 by resource sharing process 10 across jobs or tasks having at least one non-relational operation, or a combination thereof.

Figure 9:
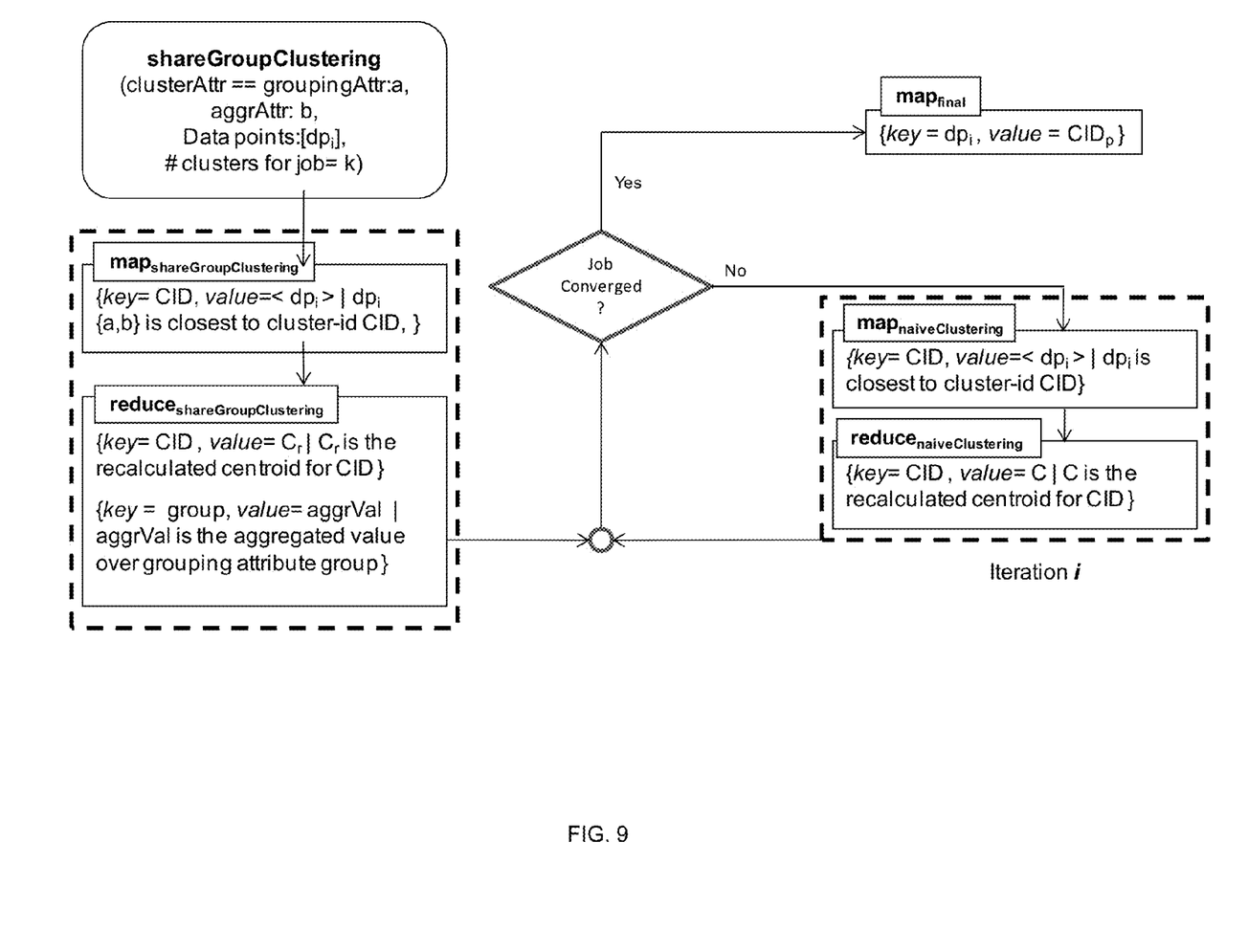
FIG. 9 is an illustrative MapReduce flowchart for shareGroupClustering for merging a clustering job with a grouping job that may be associated with the resource sharing process of FIG. 1.
Figure 10:
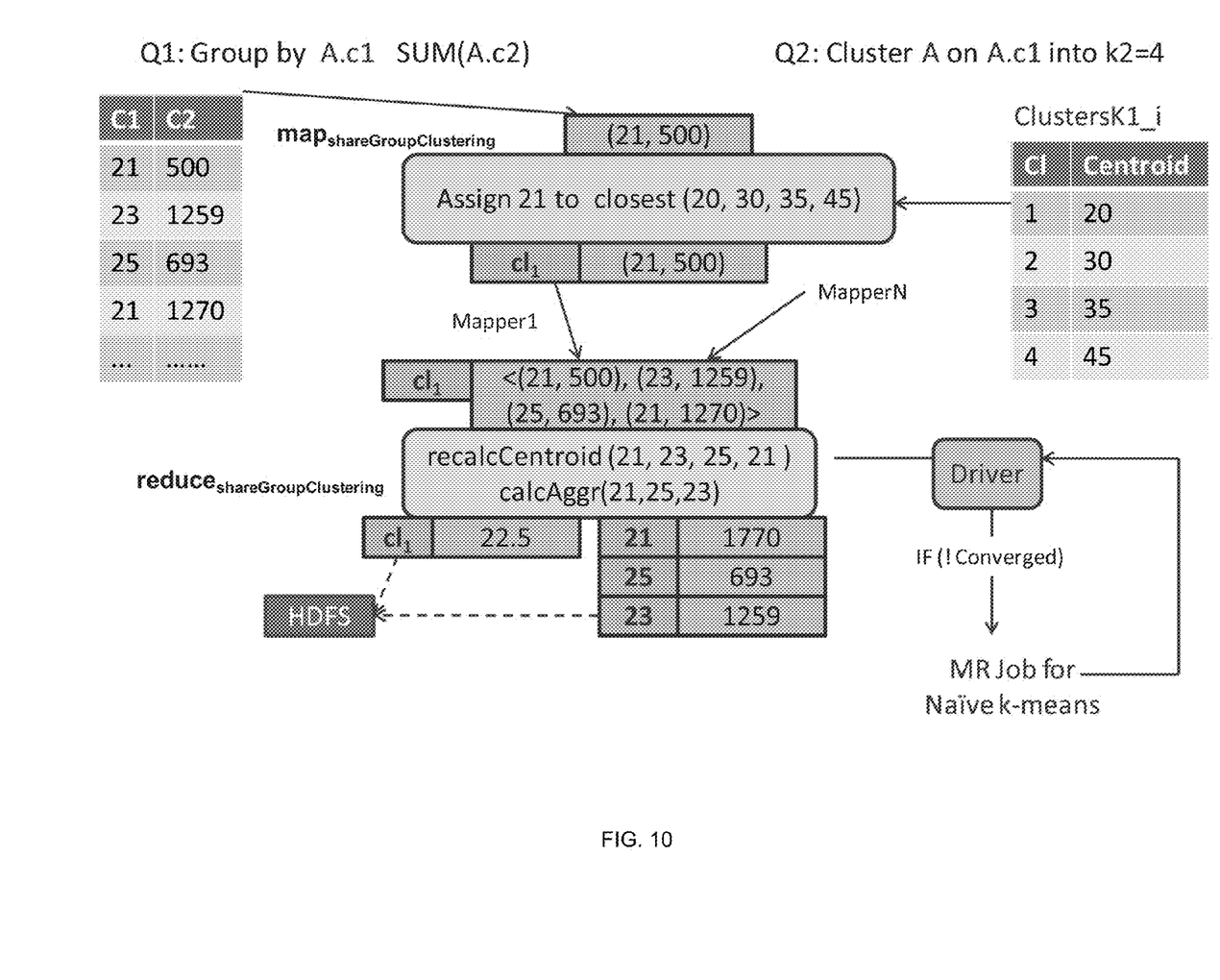
FIG. 10 illustrates the shareGroupClustering algorithm shown by FIG. 9 that may be associated with the resource sharing process of FIG. 1, where two jobs, one clustering on A.c1 (with k2=4) and another grouping on A.c1, are merged.

Another example of resource sharing process 10 sharing 204 across tasks may be additionally illustrated by FIGS. 9-10. For instance, FIG. 9 illustrates an example flowchart for an algorithm (e.g., named shareGroupClustering) for merging a clustering job with a grouping job, such that clustering and grouping are done on the (set of) attribute(s) some of which may be common. In this algorithm, for each data point, map function ($\text{map}_{shareGroupClustering}$) may find a nearest cluster center and emit that cluster-id as output key, whereas data point value is emitted as map-output value. In the reduce side (function $\text{reduce}_{shareGroupClustering}$), all data points belonging to the same cluster-id may be shared 204 to calculate new cluster center as well as aggregated value over all the data point as specified by the grouping job. New cluster centers may be shared 204 by map functions, e.g., if required for the clustering job.

An example of the shareGroupClustering algorithm of FIG. 9 is illustratively shown in FIG. 10, with an example where two jobs, one clustering on A.c1 (with k2=4) and another grouping on A.c1, are merged. As can be appreciated by those skilled in the art, A.c1 (with k2=4) and another grouping on A.c1 are examples only.

The illustrated and described plurality of parallel tasks may be executed 202 by resource sharing process 10 relative to tasks involving relational operations and at least one non-relational operation. As can be seen from the above example(s), in response to executing 202 the plurality of parallel tasks, one or more resources of the identified 200 resource sharing opportunities may be shared 204 by resource sharing process 10 across tasks involving zero or more relational operations, at least one non-relational operation, and/or a combination of.

Illustratively, the disclosure is described in relation to MapReduce-based dataflow platforms. However, those skilled in the art will appreciate that any platforms may also be used without departing from the scope of the disclosure. As such, the use of MapReduce should be taken as an example only and not to limit the scope of the disclosure.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A computer-implemented method comprising:
   identifying by a processor one or more resource sharing opportunities across a plurality of parallel tasks, wherein the plurality of parallel tasks includes one or more relational operations and at least one non-relational operation;
   executing the plurality of parallel tasks involving the one or more relational operations and the at least one non-relational operation;
   sharing, in response to executing the plurality of parallel tasks, one or more resources of the identified resource sharing opportunities across tasks involving both the one or more relational operations and at least one non-relational operation, and wherein at least one non-relational operation includes a clustering operation; and designating a task of the plurality of parallel tasks as a primary task, wherein a cluster-id of the primary task is a map output key of a merged task, and wherein in the merged task, cluster-ids of other tasks are part of map output values.

2. The computer-implemented method of claim 1 wherein sharing one or more resources includes sharing a common data input.

3. The computer-implemented method of claim 1 wherein the primary task includes at least one of a task that requires computation of highest number of clusters, a task that requires maximum number of iterations to converge, a task with fewest or containing maximum shared clustering attributes across the tasks or a combination thereof.

4. The computer-implemented method of claim 1 wherein sharing the one or more resources includes at least one of sharing data reads, sharing computations, sharing intermediate results, sharing data processing resources, sharing storage resources, sharing communication resources, sharing map output key-value pairs, and extending map output values.

5. The computer-implemented method of claim 1 wherein a map output of the merged task includes a combination of the cluster-id and a job-id as map-key, and a data value as the map-value enables, at least in part, sharing of the map-output for multiple tasks.

6. The computer-implemented method of claim 1 wherein in reduce functions of the merged task, cluster centers are calculated for the primary task, and wherein, for other tasks, post processing occurs after a reduce output to calculate cluster centers for the other tasks.

7. The computer-implemented method of claim 1 wherein a series of map and reduce functions are called until a cluster termination condition for various tasks are obtained.

8. The computer-implemented method of claim 1 wherein a data value is used as map output values.

9. The computer-implemented method of claim 2 wherein the plurality of parallel tasks includes multiple clustering tasks.

10. The computer-implemented method of claim 2 wherein the plurality of parallel tasks includes a clustering task and a multiple grouping task using one or more common data inputs in a single task of the plurality of parallel tasks.

11. The computer-implemented method of claim 9 wherein separate reduce functions for different tasks are used to calculate one or more cluster centers for each clustering task.

12. The computer-implemented method of claim 9 wherein in multiple map-reduce calls of the clustering tasks, performing one or more grouping operations.

13. The computer-implemented method of claim 11 wherein in a second reduce function, a new cluster center is calculated, and wherein values are grouped and aggregated for at least one grouping task.

* * * * *